W. A. STEINMETZ.
WRENCH.
APPLICATION FILED APR. 14, 1917.
1,251,934.
Patented Jan. 1, 1918.
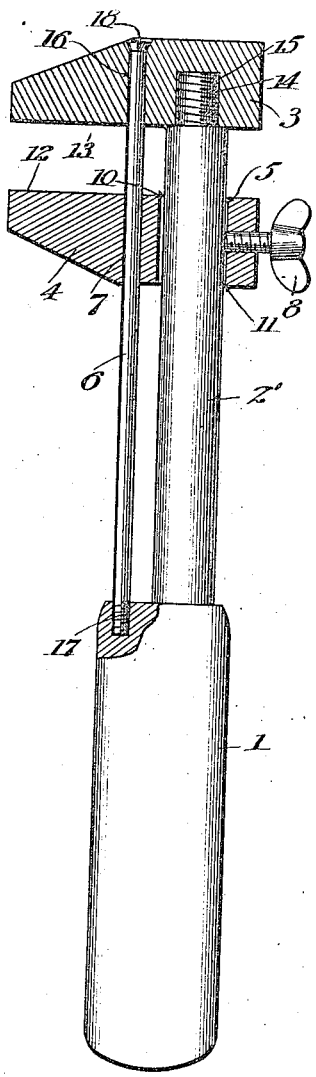
WITNESSES
Ray Rousseau
N. L. Creamer
INVENTOR
W. A. Steinmetz,
BY Victor J. Evans,
ATTORNEY

UNITED STATES PATENT OFFICE.

WALLACE A. STEINMETZ, OF THURSTON, OHIO.

WRENCH.

1,251,934.  Specification of Letters Patent.  Patented Jan. 1, 1918.

Application filed April 14, 1917. Serial No. 162,063.

*To all whom it may concern:*

Be it known that I, WALLACE A. STEINMETZ, a citizen of the United States, residing at Thurston, in the county of Fairfield and State of Ohio, have invented new and useful Improvements in Wrenches, of which the following is a specification.

This invention relates to tools, and more especially to wrenches; and the object of the same is to produce a wrench whose traveling or sliding jaw is gripped to the shank by means of a set screw and guided in its movements by a supplemental shank whereby a very cheap and yet strong and simple wrench can be produced.

The invention consists in the specific structure of the elements which go to make up this wrench, whereby little if any machining is necessary after said elements are first stamped out. The invention furthermore consists in the assembly of elements, rendered easy by their structure, and wherein the supplemental shank or rod serves as a lock for preventing the outer jaw from rotating or unscrewing from the main shank and for holding the inner jaw ever in strict alinement with such outer jaw; yet provision is made for the ready removal of said rod from both jaws and the handle, after which the elements may be easily disconnected.

The following specification describes the preferred manner of carrying out the invention, reference being made to the drawing which gives a side elevation of the wrench, partly broken away.

In the type of my invention shown the shank 2′ is made round, mainly because it is easier to stamp the handle 1 oval and the shank round than it is to form them integral and make the shank angular or square without later machining the product. The extremity of the shank is threaded as shown at 14 and screwed into a threaded socket 15 in the inner face of the fixed jaw 3; and of course the opening 5 through the traveling jaw 4 will be round to correspond with the contour of the shank. Here again, it is probably easier to form a round opening through the jaw 4 than a square one, and it is quite easy to form a round socket 15 in the fixed jaw 3 and later counter-bore it to produce the threads. The drawing also shows the supplemental shank 6 as round, or more strictly speaking in the shape of a rod passed through an opening 16 in the jaw 3, extended thence through an opening 7 in the jaw 4, and finally screwed as at 17 into the handle 1, for which purpose the headed or outer end of this rod may be nicked as at 18 for the reception of a screw driver, and also it has a head countersunk into the outer side of the jaw 3 so as to give the parts additional strength. When this shank 2′ is round, of course there is the possibility that the traveling jaw 4 might rotate upon it; and also when the shank is screwed into the fixed jaw 3, there is the possibility that it might unscrew. But with the use of the supplemental shank or rod the added advantage is here present that its passage through both jaws prevents either of them from rotating on the shank, whereas it has also the advantageous function above set forth. If it becomes necessary to separate the parts, this rod can be withdrawn by unscrewing it so that its threaded extremity 17 comes out of the handle 1, after which it can be entirely removed; then the fixed jaw 3 can be unscrewed from the threaded end 14 of the shank, and all parts are separable. This wrench may be made of any suitable size and material, but I prefer metal throughout. While I say metal throughout, it is quite possible to inset wooden panels in the sides of the handle in a manner well known and constituting no part of the present invention, and therefore not necessary to illustrate.

What is claimed as new is:—

The herein described wrench structure comprising a handle, a shank projecting integrally therefrom and having its outer end reduced and threaded, and a fixed jaw having a socket in its inner face screwed onto the threaded end of the shank and an opening completely through its body parallel with the axis of said socket and countersunk in the outer face of said jaw; combined with a round lock rod passing through said opening and having a nicked head fitting said countersink, its body standing parallel with the shank, and its inner end being screwed into the handle, a traveling jaw having two openings respectively of the size and shape of the shank and the rod and mounted loosely thereon, and means for fastening the traveling jaw in adjusted position on said shank, for the purpose set forth.

In testimony whereof I affix my signature.

WALLACE A. STEINMETZ.